United States Patent [19]

Okajima et al.

[11] Patent Number: 5,063,443
[45] Date of Patent: Nov. 5, 1991

[54] CODEC SYSTEM ENCODING AND DECODING AN IMAGE SIGNAL AT A HIGH SPEED

[75] Inventors: Masayuki Okajima, Tokyo; Toru Shibuya, Miyagi, both of Japan

[73] Assignee: NEC Corporation, Tokyo, Japan

[21] Appl. No.: 524,900

[22] Filed: May 18, 1990

[30] Foreign Application Priority Data

May 18, 1989 [JP] Japan .................................. 1-125634

[51] Int. Cl.⁵ .............................................. H04N 7/12
[52] U.S. Cl. .................................... 358/133; 358/136; 358/13
[58] Field of Search ............... 358/135, 133, 134, 136, 358/13, 27

[56] References Cited

U.S. PATENT DOCUMENTS

| | | | |
|---|---|---|---|
| 4,133,006 | 1/1979 | Linuma | 358/136 |
| 4,307,420 | 12/1981 | Ninomiya et al. | 358/136 |
| 4,591,908 | 5/1986 | Hirano | 358/133 |
| 4,591,909 | 5/1986 | Kuroda et al. | 358/136 |
| 4,720,743 | 1/1988 | Linuma et al. | 358/133 |
| 4,743,967 | 5/1988 | Takenaka et al. | 358/136 |
| 4,768,092 | 8/1988 | Ishikawa | 358/135 |
| 4,942,465 | 7/1990 | Ohta | 358/135 |
| 4,942,476 | 7/1990 | Koga et al. | 358/135 |

Primary Examiner—James J. Groody
Assistant Examiner—Michael H. Lee
Attorney, Agent, or Firm—Sughrue, Mion, Zinn, Macpeak & Seas

[57] ABSTRACT

In a predictive encoder device supplied with an input image signal divisible into odd and even number line signals, first and second predictive encoders (32, 37) individually carry out predictive encoding of the odd and the even number line signals into first and second encoded signals at a comparatively low speed by the use of first and second local decoded signals, respectively. The first and the second local decoded signals are supplied to the second and the first predictive encoders through delay circuits (42, 43), respectively, to predict a current picture element with reference to picture elements located on adjacent lines. Two delay circuits (36, 44) are connected to an output terminal (32c) of the first predictive encoder and to an input terminal (37a) of the second predictive encoder to adjust timings of the first and the second encoded signals. A predictive decoder device also comprises first and second predictive decoders (62, 83) corresponding to the first and the second predictive encoders.

6 Claims, 4 Drawing Sheets

FIG. 4
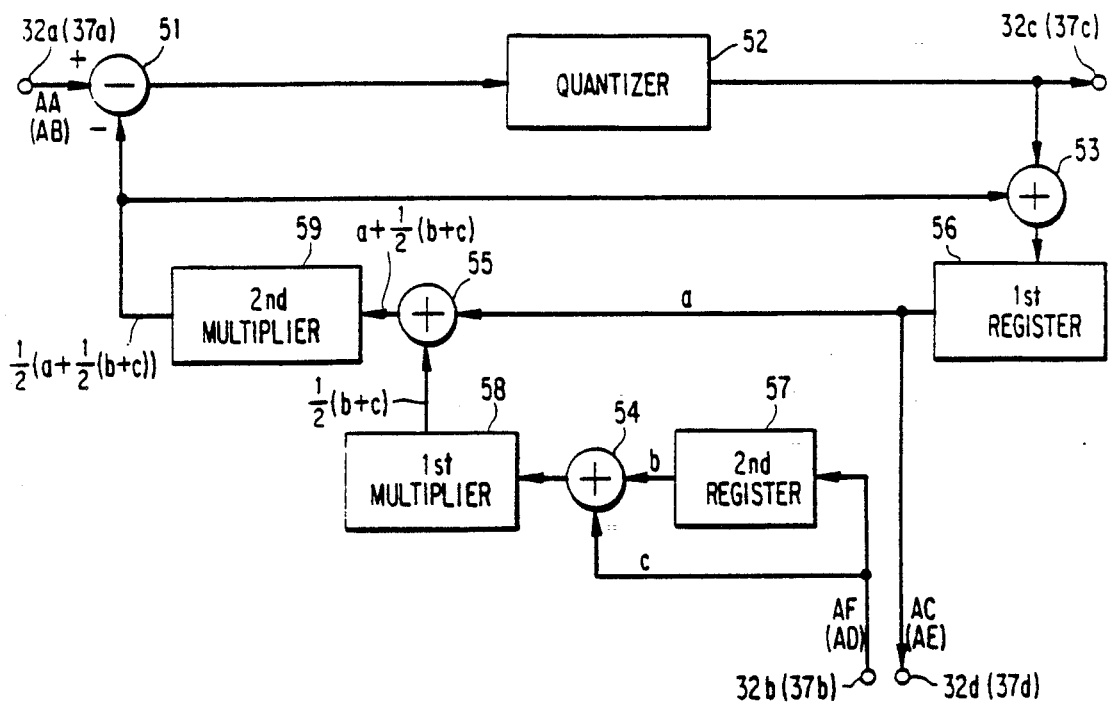
FIG. 5
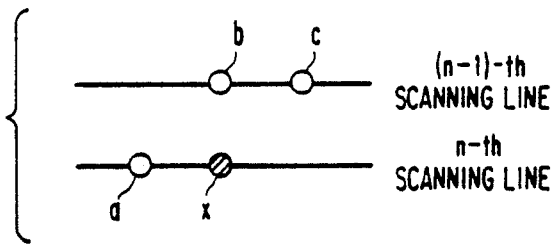
FIG. 6
| | | | | | | |
|---|---|---|---|---|---|---|
| AA | 5-1 | 5-2 | 5-3 | 5-4 | 5-5 | 5-6 |
| AB | 4-856 | 4-857 | 4-858 | 6-1 | 6-2 | 6-3 |
| AC | 3-858 | 5-1 | 5-2 | 5-3 | 5-4 | 5-5 |
| AD | 3-857 | 3-858 | 5-1 | 5-2 | 5-3 | 5-4 |
| AE | — | 4-855 | 4-856 | 4-857 | 4-858 | 6-1 | 6-2 |
| AF | 4-2 | 4-3 | 4-4 | 4-5 | 4-6 | 4-7 |

FIG. 10
| | | | | | | |
|---|---|---|---|---|---|---|
| AA | 5-1 | 5-2 | 5-3 | 5-4 | 5-5 | 5-6 |
| AB | 4-999 | 4-1000 | 6-1 | 6-2 | 6-3 | 6-4 |
| AC | 3-1000 | 5-1 | 5-2 | 5-3 | 5-4 | 5-5 |
| AD | 3-999 | 3-1000 | 5-1 | 5-2 | 5-3 | 5-4 |
| AE | 4-998 | 4-999 | 4-1000 | 6-1 | 6-2 | 6-3 |
| AF | 4-1 | 4-2 | 4-3 | 4-4 | 4-5 | 4-6 |
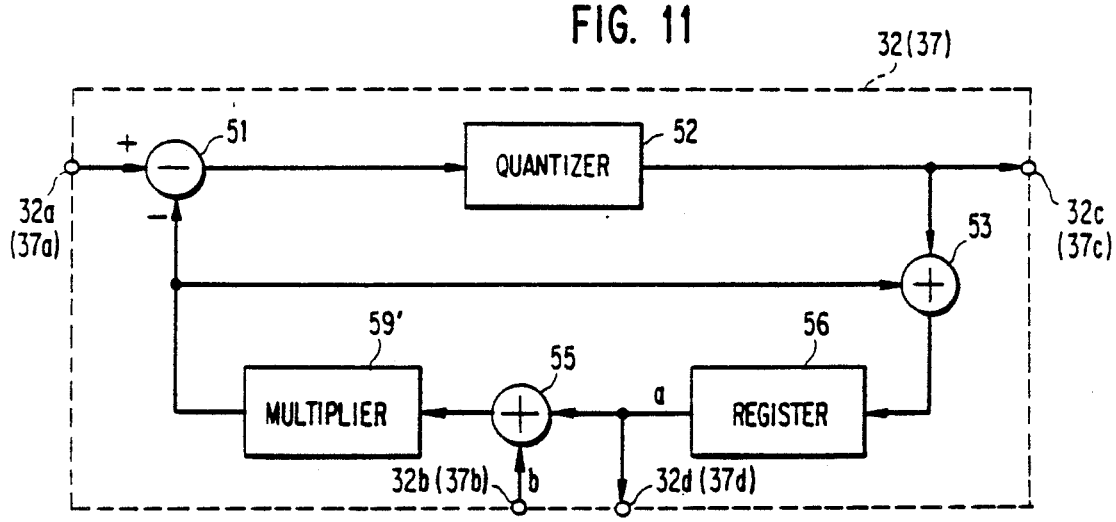
FIG. 11
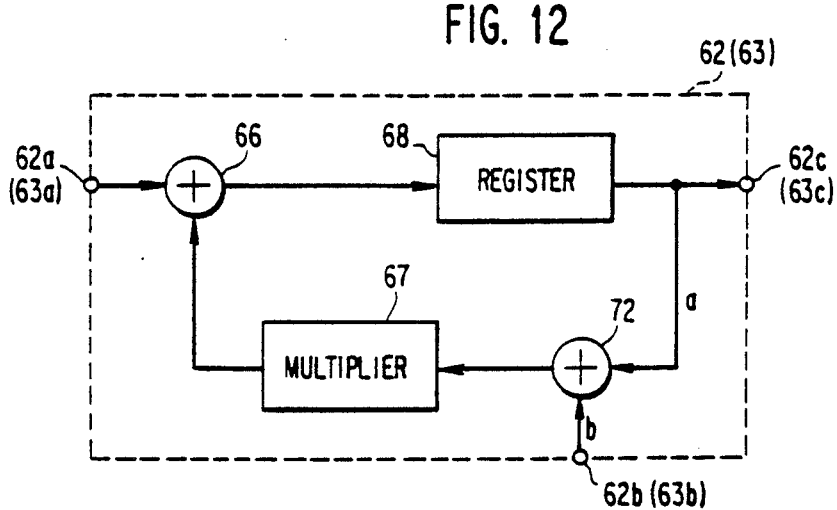
FIG. 12

CODEC SYSTEM ENCODING AND DECODING AN IMAGE SIGNAL AT A HIGH SPEED

BACKGROUND OF THE INVENTION

This invention relates to a CODEC system for use in efficiently encoding and decoding an input image signal, such as a television signal, a video signal, which is representative of a sequence of picture elements. It is to be noted throughout the instant specification that the input image signal is given as a sequence of digital image signals and that each of the picture elements is provided in the form of a digital picture element signal produced within a sample period.

As well known in the art, an image is displayed on a display device in response to an input image signal and is structured by a preselected number of scanning lines divisible into odd number scanning lines and even number scanning lines. In this connection, it is to be noted here that the input image signal is also divisible into an odd number line signal and an even number line signal for the odd number line and the even number line, respectively. When the input image signal is a television signal used in an NTSC system, the odd number line signal and the even number line signal appear within each of fields.

In order to efficiently encode and decode such an input image signal, a CODEC system of the type described often comprises a predictive encoding device and a predictive decoding device which carry out predictive encoding and predictive decoding of the input image signal. In each of the predictive encoding device and the predictive decoding device, a local decoded signal or a local predictive signal should be produced therein before prediction is carried out as regards a current picture element of a current scanning line. Such a local decoded signal or a local predictive signal is derived from a previous picture element received with a previous scanning line before reception of the current picture element. This means that each of the picture elements must be precessed during each sample period in each of the predictive encoding device and the predictive decoding device to produce each local decoded signal or each local predictive signal. Accordingly, predictive encoding and predictive decoding operations of the input image signal should be carried out at a high speed in the predictive encoding device and the predictive decoding device. For this purpose, each of the predictive encoding device and the predictive decoding device must be implemented by a high speed processing device which is usually expensive and which has a large power consumption, so as to process such an input image signal. In other words, it is difficult to use a general-purpose processing device which is inexpensive and which has a low processing speed and a low power consumption.

SUMMARY OF THE INVENTION

It is an object of this invention to provide a CODEC system which is capable of encoding and decoding an input image signal at a low cost.

It is another object of this invention to provide a predictive encoding device which can be used for a CODEC system of the type described and which is capable of quickly encoding the input image signal at a low cost.

It is still another object of this invention to provide a predictive decoding device which can be used for a CODEC system of the type described and which is communicable with the predictive encoding device mentioned above.

It is yet another object of this invention to provide a CODEC system of the type described, which consumes low electric power.

According to an aspect of this invention, a predictive encoding device is operable in response to an input image signal to encode the input image signal into an output encoded signal. The input image signal is divisible into an odd number line signal and an even number line signal. The predictive encoding device comprises line separating means responsive to the input image signal for separating the input image signal into the odd number line signal and the even number line signal, first predictive encoding means coupled to the line separating means and responsive to a selected one of the odd and the even number line signals for carrying out predictive encoding of the selected one of the odd and the even number line signals to produce a first encoded signal and a first local decoded signal, first delay means coupled to the line separating means for delaying a remaining one of the odd and the even number line signals to produce a delayed line signal, second predictive encoding means responsive to the delayed line signal for carrying out predictive encoding of the delayed line signal to produce a second encoded signal and a second local decoded signal, second delay means coupled to the first predictive encoding means and responsive to the first local decoded signal for delaying the first local decoded signal to supply the second predictive encoding means with a first delayed local decoded signal and to make the second predictive encoding means carry out the predictive encoding on the basis of the first delayed local decoded signal, third delay means coupled to the second predictive encoding means for delaying the second local decoded signal to supply the first predictive encoding means with a second delayed local decoded signal and to make the first predictive encoding means carry out the predictive encoding on the basis of the second delayed local decoded signal, fourth delay means coupled to the first predictive encoding means and responsive to the first encoded signal for delaying the first encoded signal in relation to the second encoded signal to produce a first delayed encoded signal, and multiplexing means for multiplexing the first delayed encoded signal and the second encoded signal to alternatingly produce the first delayed encoded signal and the second encoded signal as the output encoded signal.

According to another aspect of this invention, a predictive decoding device is operable in response to an input encoded image signal to decode the input encoded image signal into an output decoded signal. The input encoded image signal is subjected to predictive encoding and divisible into an odd number line signal and an even number line signal. The predictive decoding device comprises a line separating circuit responsible to the input encoded image signal for separating the input encoded image signal into the odd number line signal and the even number line signal, a first predictive decoding circuit responsive to a selected one of the odd and the even number line signals for carrying out predictive decoding of the selected one of the odd and the even number line signals to produce a first decoded signal, a first delay circuit for delaying a remaining one of the odd and the even number line signals to produce a delayed line signal, a second predictive decoding circuit responsive to the delayed line signal for carrying out predictive decoding of the delayed line signal to produce a second decoded signal, a second delay circuit for delaying the first decoded signal to produce a first delayed decoded signal and to supply the second predictive decoding circuit with the first delayed decoded signal, a third delay circuit for delaying the second decoded signal to produce a second delayed decoded signal and to supply the first predictive decoding circuit with the second delayed decoded signal, a fourth delay circuit coupled to the first predictive decoding circuit for delaying the first decoded signal to adjust the first decoded signal with the second decoded signal and to produce an adjusted decoded signal, and a line multiplexing circuit for alternatingly producing the adjusted decoded signal and the second decoded signal as the output decoded signal.

BRIEF DESCRIPTION OF THE DRAWING

FIG. 4 is a block diagram of a predictive encoder for use in the predictive encoding device illustrated in FIG. 3;

FIG. 5 shows a part of scanning lines for use in describing operation of the predictive encoder illustrated in FIG. 4;

FIG. 6 is a time chart for use in describing operation of the predictive encoding device illustrated in FIG. 3;

FIG. 10 is a time chart for use in describing operation of a predictive encoding device used in the CODEC system;

FIG. 11 is a block diagram of a predictive encoder for use in the predictive encoding device operable in accordance with FIG. 10; and FIG. 12 is a block diagram of a predictive decoder for use in the CODEC system illustrated in FIG. 10.

DESCRIPTION OF THE PREFERRED EMBODIMENTS

Figure 1:
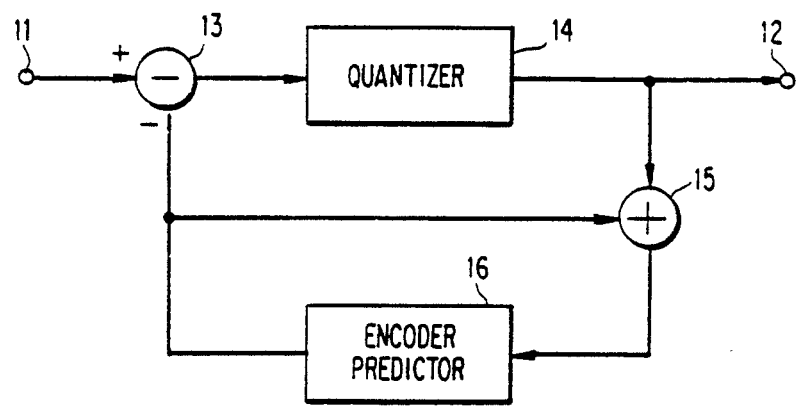
FIG. 1 is a block diagram of a predictive encoding device for use in a conventional CODEC system.
Figure 2:
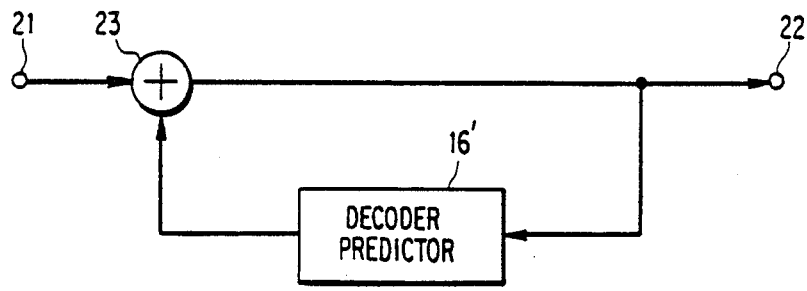
FIG. 2 is a block diagram of a predictive decoding device communicable with the predictive encoding device illustrated in FIG. 1.

Referring to FIGS. 1 and 2, description will be made for a better understanding of this invention as regards a conventional CODEC system which comprises a predictive encoder and a predictive decoder illustrated in FIGS. 1 and 2, respectively. In FIG. 1, the illustrated predictive encoder is supplied with an input image signal through an encoder input terminal 11 to produce an encoded signal through an encoder output terminal 12. In the example being illustrated, the input image signal is assumed to be a television signal in the NTSC system and may be sent from an analog-to-digital converter (not shown) as a sequence of digital image signals each of which is in one-to-one correspondence to a single one of the picture elements.

As shown in FIG. 1, the predictive encoder comprises a subtracter 13 supplied with the input image signal and a predictive signal to calculate a difference between the input image signal and the predictive signal and to produce a difference signal representative of the difference. The difference signal is quantized by a quantizer 14 into a quantized signal. The quantized signal is produced as the encoded signal through the output terminal 12 on one hand and is sent to an adder 15 on the other hand. The adder 15 is supplied with both the predictive signal and the encoded signal to add the predictive signal to the encoded signal and to produce a local decoded signal which is identical with a decoded signal to be decoded by the predictive decoder illustrated in FIG. 2, when no error takes place between the predictive encoder and the predictive decoder. The local decoded signal is delivered from the adder 15 to an encoder predictor 16. In the encoder predictor 16, the local decoded signal is rendered into the predictive signal which is sent to the subtracter 13. Thus, the input image signal is successively encoded into the encoded signal.

On the other hand, the encoded signal is sent from the predictive encoder shown in FIG. 1 to the predictive decoder illustrated in FIG. 2. Thus, the encoded signal is given to the predictive decoder as an input encoded or predictive signal through a decoder input terminal 21. The predictive decoder decodes the input predictive signal into the decoded signal which corresponds to the input image signal supplied to the encoder input terminal 11 and which is produced through a decoder output terminal 22. Specifically, the input encoded signal is supplied to an adder 23 which is given a local predictive signal. The adder 23 adds the local predictive signal to the input encoded signal to produce a sum signal representative of a sum of the local predictive signal and the input encoded signal. The sum signal is produced as the decoded signal through the decoder output terminal 22 on one hand and is delivered to a decoder predictor 16' on the other hand. Responsive to the decoded signal, the decoder predictor 16' supplies the local predictive signal to the adder 23.

In FIG. 1, let a current one of the picture elements be supplied as a current digital signal to the subtracter 13 for a current time interval and encoded into a current encoded signal. On reception of the current digital signal, the subtracter 13 should be supplied with the predictive signal produced within the predictive encoder with respect to a previous picture element. This means that the local decoded signal is also produced with respect to the previous picture element for the current time interval in the predictive encoder.

Likewise, when a current input encoded signal is given to the adder 23 illustrated in FIG. 2, the adder 23 should be supplied with the local predictive signal predicted with respect to a previous picture element preceding the current picture element.

Under the circumstances, it is readily understood that processing must be executed at a very high speed in the predictive encoder and the predictive decoder. Therefore, the illustrated encoder and decoder have disadvantages, as pointed out in the preamble of the instant specification.

Figure 3:
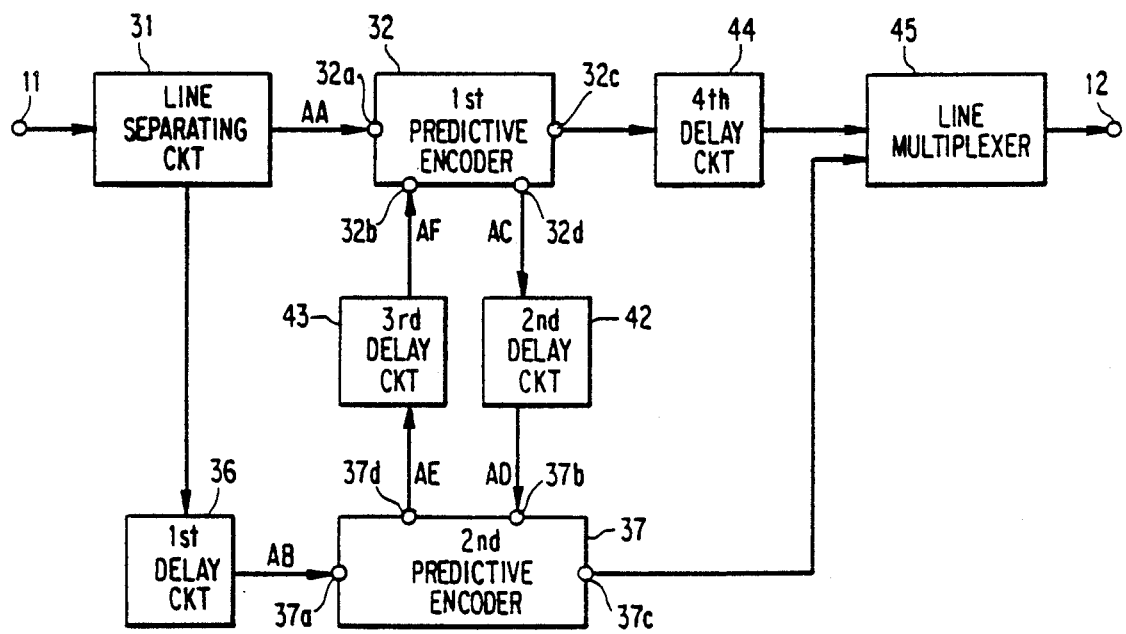
FIG. 3 is a block diagram of a predictive encoding device according to an embodiment of this invention.

Referring to FIG. 3, a predictive encoding device according to a first embodiment of this invention is supplied with an input image signal through an encoder input terminal 11 to produce an encoded signal through an encoder output terminal 12, like in FIG. 1.

The input image signal is assumed to be a television signal in the NTSC system like in FIGS. 1 and 2. As well known in the art, an image is displayed on a display unit (not shown) in response to the input image signal and is formed by a preselected number of fields each of which is composed of scanning lines which are divisible into odd number scanning lines and even number scanning lines. Therefore, the input image signal is also divisible into odd number line signals and even number line signals for the odd number scanning lines and the even number scanning lines, respectively.

In addition, let a predetermined number of picture elements be arranged on each of the scanning lines and be equal to 858. This means that each of the odd number line signals and the even number line signals may be considered as being composed of the predetermined number of picture elements. Herein, the predetermined number of the picture elements may be assumed to be equal to the number of samples, namely, sampled picture elements each of which is produced for a prescribed interval of time. The prescribed interval will be called a sample period hereinunder.

In FIG. 3, the predictive encoding device comprises a line separating circuit 31 supplied with the input image signal through the encoder input terminal 11. The line separating circuit 31 separates the input image signal into the odd number line signals and the even number line signals both of which are produced through first and second output terminals, respectively. The line separating circuit 31 may be formed by the use of a combination of a demultiplexer and a timing control circuit (not shown) both of which are known in the art.

In the example being illustrated, the odd number line signal is sent from the first output terminal of the line separating circuit 31 to a first predictive encoder 32. The first predictive encoder 32 has first and second encoder input terminals 32a and 32b and first and second encoder output terminals 32c and 32d and receives the odd number line signal at the first encoder input terminal 32a. As will later become clear, the first predictive encoder 32 produces a first encoded signal and a first local decoded signal through the first and the second encoder output terminals 32c and 32d, respectvely, in a manner to be described later.

On the other hand, the even number line signal is sent through a first delay circuit 36 to a second predictive encoder 37. Herein, the first delay circuit 36 has a first delay time equal to three sample periods.

The second predictive encoder 37 is similar in structure and operation to the first predictive encoder 32 and therefore has first and second encoder input terminals 37a and 37b and first and second encoder output terminals 37c and 37d. Supplied with the even number line signals delayed by the first delay circuit 36, the second predictive encoder 37 produces a second encoded signal and a second local decoded signal through the first and the second encoder output terminals 37c and 37d, respectively. The delayed even number line signals may be referred to as delayed line signal.

The first local decoded signal is delivered from the second encoder output terminal 32d of the first predictive encoder 32 through a second delay circuit 42 to the second encoder input terminal 37b of the second predictive encoder 37. The second delay circuit 42 has a second delay time equal to a single sample period.

Likewise, the second local decoded signal is delivered from the second encoder output terminal 37d of the second predictive encoder 37 through a third delay circuit 43 to the second encoder input terminal 32b of the first predictive encoder 32. The third delay circuit 43 has a third delay time equal to 853 sample periods.

In addition, the first encoded signal is supplied through a fourth delay circuit 44 to a line multiplexer 45 which is also supplied with the second encoded signal. The fourth delay circuit 44 has a fourth delay time equal to three sample periods.

The line multiplexer 45 alternatingly selects either the first encoded signal delayed by the fourth delay circuit 44 or the second encoded signal to produce a selected encoded signal as an output encoded signal through the encoder output terminal 12.

Referring to FIGS. 4 and 5 in addition to FIG. 3, a predictive encoder is available for each of the first and the second encoders 32 and 37 illustrated in FIG. 3 and is assumed to be used as the first encoder 32 for brevity of description. Inasmuch as similar operation is carried out when the illustrated predictive encoder is used as the second encoder 37, the following description will apply to the second encoder 37 as it stands. In addition, it is presumed that the illustrated predictive encoder carries out intra-field prediction as regards the input image signal which may be a television signal used in the NTSC system.

In FIG. 5, let an n-th scanning line and an (n−1)-th scanning line be current and preceding scanning lines within the same field, where n is a natural number, and a first previous picture element a and a current picture element x be arranged on the n-th scanning line, as illustrated in FIG. 5. Furthermore, let second and third previous picture elements b and c be arranged on the (n−1)-th scanning line. Under the circumstances, it is surmised in the predictive encoder illustrated in FIG. 4 that the current picture element x is predicted by the intra-field prediction on the basis of Equation 1 given by:

$$x = \tfrac{1}{2}(a + \tfrac{1}{2}(b+c)). \tag{1}$$

As shown in FIG. 4, the predictive encoder has the first and the second encoder input terminals 32a and 32b and the first and the second output terminals 32c and 32d and comprises a subtracter circuit 51, a quantizer circuit 52, first through third adders 53, 54, and 55, first and second registers 56 and 57, and first and second multipliers 58 and 59. More particularly, the subtracter circuit 51 is given the odd number line signal and a local predictive signal from the first encoder input terminal 32a and the second multiplier 59, respectively. It is to be noted here that the odd number line signal is supplied to the illustrated predictive encoder at every other scanning line and that the local predictive signal is representative of a result of the intra-field prediction carried out in accordance with Equation 1. This shows that the intra-field prediction may slowly proceed in the illustrated predictive encoder in comparison with the conventional encoder illustrated in FIG. 1. At any rate, the subtracter circuit 51 subtracts the local predictive signal from the odd number line signal to calculate a difference between the odd number line signal and the local predictive signal and produce a difference signal representative of the difference.

The difference signal is quantized by the quantizer 52 into a quantized signal which is sent to the first encoder output terminal 32c as the first encoded signal at every other scanning line. The first encoded signal is also sent to the first adder 53 which is supplied from the second multiplier 59 with the local predictive signal. The first adder 53 adds the first encoded signal to the local predictive signal to produce the first local decoded signal. The first local decoded signal is delivered from the first adder 53 through the first register 56 to both the second encoder output terminal 32d and the third adder 55. From this fact, it is readily understood that the first local decoded signal is delivered from the first predictive encoder 32 (FIG. 3) to the second predictive encoder 37 through the second delay circuit 42.

On the other hand, the second local decoded signal is sent from the second predictive encoder 37 through the third delay circuit 43 to the second encoder input terminal 32b and is given to the second adder 54 and the second register 57 of the first predictive encoder 32.

Now, it should be recollected that the intra-field prediction is executed in accordance with Equation (1) and that the second local decoded signal is calculated as regards the even number line signal, as specified by b and c in FIG. 5. Specifically, the second local decoded signal is concerned with the second and the third previous picture elements b and c arranged on the preceding or even number scanning line when the current picture element x is given as the odd number line signal. As readily understood from FIG. 5, the first, the second, and the third previous picture elements a, b and c precede the current picture element x by a single picture element, 858 picture elements, and 857 picture elements, respectively. Accordingly, the first local decoded signal is delayed by the single sample period in the first register 56 so as to specify the first previous picture element a while the second local decoded signal is delivered through the second register 57 and direct to the second adder 54 to specify the second and the third previous picture elements b and c, respectively. This shows that the second decoded signal is also delayed by the single sample period in the second register 57. In this event, the second register 57 serves to delay the second local decoded signal by the single sample period. Thus, the second adder 54 produces a sum signal which corresponds to the term (b+c) of Equation (1). The sum signal is multiplied by a factor of ($\frac{1}{2}$) in the first multiplier 58 to calculate a product of ($\frac{1}{2}$) and (b+c). The product is delivered to the third adder 55 which is supplied from the first register 56 with the first local decoded signal concerned with the first previous picture element a. Thus, the third adder 55 supplies the second multiplier 59 with a sum signal which corresponds to a+($\frac{1}{2}$) (b+c) and which is multiplied by a factor of ($\frac{1}{2}$) in the second multiplier 59. As a result, the second multiplier 59 produces a multiplier output signal represented by Equation (1) and supplies the subtracter circuit 51 and the first adder 53 with the multiplier output signal as the local predictive signal. From the above, it is understood that the predictive encoder illustrated in FIG. 4 can execute the intra-field prediction in accordance with Equation (1). As mentioned before, a combination of the first and the second registers 56 and 57, the second and the third adders 54 and 55, and the first and the second multipliers 58 and 59 will be called a calculating circuit for calculating the local predictive signal.

In order to describe operation of the predictive encoding device illustrated in FIG. 3 in connection with FIG. 4 more in detail, let the first and the second predictive encoders 32 and 37 encode the fifth and the sixth line signals, respectively.

Referring to FIG. 6 together with FIGS. 3 and 4, the line separating circuit 31 simultaneously delivers the fifth and the sixth line signals in parallel to the first predictive encoder 32 and the first delay circuit 36, respectively. The fifth line signal is depicted at AA along a top line of FIG. 6 and includes picture element signals specified by 5-1, 5-2, . . . , 5-6 which are successively given to the first predictive encoder 32 through the first encoder input terminal 32a. On the other hand, the sixth line signal is delivered to the second predictive encoder 37 through the first delay circuit 36 having the first delay time of the three sample periods and the first encoder input terminal 37a. Accordingly, the sixth line signal is supplied to the second predictive encoder 37 in the form of a delayed sixth line signal AB, as illustrated along a second line of FIG. 6. Specifically, the delayed sixth line signal includes delayed picture element signals of the even number line signals. The delayed picture element signals are numbered from 4-856, 4-858, 6-1, 6-2, . . . , which are synchronized with the picture element signals 5-1, 5-2, 5-8, . . . of the fifth line signal, respectively, as shown in FIG. 6.

The fifth line signal and the delayed sixth line signal are encoded by the first and the second predictive encoders 32 and 37, respectively, in the manner described in conjunction with FIG. 4. In this event, the first predictive encoder 32 delivers the first local decoded signal (depicted at AC along a third line of FIG. 6) from the first register 56 through the second encoder output terminal 32d to the second delay circuit 42 having the single sample period. The first local decoded signal AC is further delayed by the single sample period with respect to the odd number scanning lines through the second delay circuit 42 and sent to the second predictive encoder 37. Therefore, the second predictive encoder 37 is supplied with a first delayed local decoded signal depicted at AD along a fourth line of FIG. 6. As shown in FIG. 6, the first delayed local decoded signal AD is delayed by the single sample period as compared with the first local decoded signal AC produced by the first register 56.

On the other hand, the second predictive encoder 37 is supplied with the delayed sixth line signal AB to carry out the intra-field prediction in a manner to be described in connection with FIG. 4. Consequently, the second predictive encoder 37 produces the second local decoded signal AE which is shown along a fifth line of FIG. 6 and which is delayed by the single sample period with respect to the delayed sixth line signal AB. The second local decoded signal AE is sent through the third delay circuit 43 having the third delay time equal to 853 sample periods to be sent as a second delayed local decoded signal AF as shown along a bottom line of FIG. 6.

As shown in FIG. 6, the first predictive encoder 32 is given picture element signals 4-2, 4-3, . . . of a fourth line signal in synchronism with the picture element signals 5-1, 5-2, . . . , respectively. Thus, the first predictive encoder 32 carries out the intra-field prediction in the manner mentioned with reference to FIG. 4.

On the other hand, the second predictive encoder 37 is supplied with the delayed sixth line signal AB and the first delayed local decoded signal AD from the first delay circuit 36 and the second delay circuit 42, respectively. This shows that the delayed sixth line signal AB is subjected to the intra-field prediction with reference to the first delayed local decoded signal AD derived from the fifth scanning line.

When the second predictive encoder 37 starts the intra-field prediction simultaneously with the first predictive encoder 32, the first local decoded signal can not be produced in connection with the fifth scanning line on encoding the sixth scanning line. In other words, the first local decoded signal of the fifth scanning line is late for encoding the sixth scanning line. This makes it difficult to encode the sixth scanning line.

The first delay circuit 36 serves to delay the sixth line signal and to delay encoding operation of the sixth line signal in relation to encoding operation of the fifth line signal. Likewise, the second delay circuit 42 serves to adjust timings of the delayed even line signal AB to timings of the first delayed local decoded signal AD derived from the preceding scanning line.

When the first predictive encoder 32 carries out prediction encoding of the fifth line signal, the second local decoded signal concerned with the fourth scanning line should be already given to the first predictive encoder 32. To this end, the second local decoded signal AE is delivered from the second predictive encoder 37 through the third delay circuit 43 having the third delay time equal to 853 sample periods. In addition, the second encoded signal is delayed by three sample periods in comparison with the first encoded signal because the even line signal is delayed by the first delay circuit 36 for the three sample periods. Therefore, the fourth delay circuit 44 delays the first encoded signal for three sample periods to produce a first delayed encoded signal. The first delayed encoded signal and the second encoded signal are sent to the line multiplexer 45 to be alternatingly selected and to be produced as the encoded output signal at a predetermined transmission rate.

Figure 7:
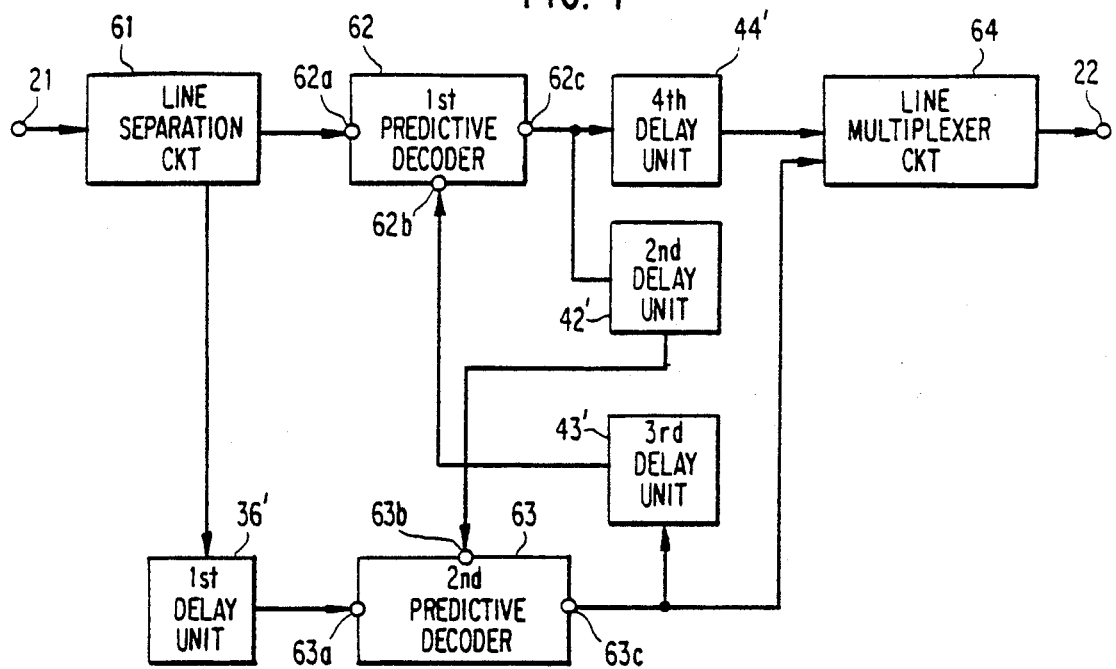
FIG. 7 is a block diagram of a predictive decoding device communicable with the predictive encoding device illustrated in FIG. 3.

Referring to FIG. 7, a predictive decoding device is for use in combination with the predictive encoding device illustrated in FIG. 3 and has a decoder input terminal 21 and a decoder output terminal 22, like in FIG. 2. The illustrated predictive decoding device is supplied through the decoder input terminal 21 with an input encoded signal identical with the encoded output signal sent from the predictive encoding device illustrated in FIG. 3. The predictive decoding device comprises a line separation circuit 61 operable in a manner similar to the line separating circuit 31 illustrated in FIG. 3. Therefore, the line separation circuit 61 separates the input encoded signal into an odd number encoded signal and an even number encoded signal both of which are produced in parallel to each other. The odd number encoded signal and the even number encoded signal are delivered direct to a first predictive decoder 62 and through a first delay unit 36' to a second predictive decoder 63, respectively. The first delay unit 36' is similar to the first delay circuit 36 illustrated in FIG. 3 and has a first delay time equal to three sample periods.

The first predictive decoder 62 has first and second decoder input terminals 62a and 62b and a decoder output terminal 62c while the second predictive decoder 63 has first and second decoder input terminals 63a and 63b and a decoder output terminal 63c. The first predictive decoder 62 is supplied through the first decoder input terminal 62a with the odd number encoded signal to produce a first decoded signal through the decoder output terminal 62c while the second predictive encoder 63 is supplied through the first decoder input terminal 63a with the even number encoded signal delayed for three sample periods by the first delay unit 36' and produces a second decoded signal through the decoder output terminal 63c.

The first decoded signal is supplied to the second decoder input terminal 63b of the second predictive decoder 63 through a second delay unit 42'. The second delay unit 42' is similar to the second delay circuit 42 illustrated in FIG. 3 and therefore has a second delay time equal to a single sample period. The first decoded signal is also supplied to a line multiplexer circuit 64 through a fourth delay unit 44' which is similar to the fourth delay circuit 44 of FIG. 3 and which has a fourth delay time equal to three sample periods.

The second decoded signal is supplied directly to the line multiplexer 64 on one hand and to the second decoder input terminal 62b of the first predictive decoder 62 through a third delay unit 43' on the other hand. The third delay unit 43' is similar to the third delay circuit 43 shown in FIG. 3 and therefore has a third delay time equal to 853 sample periods. selects the first and the second decoded signals to produce an output decoded signal through the decoder output terminal 22. The output decoded signal is a reproduction of the input image signal given to the predictive encoding device illustrated in FIG. 3.

Figure 8:
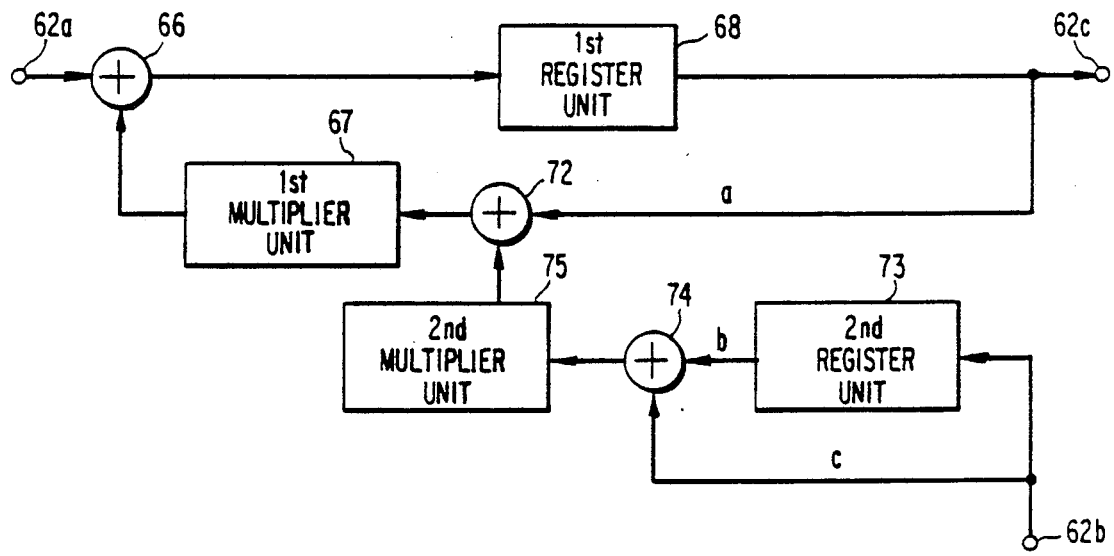
FIG. 8 is a block diagram of a predictive decoder for use in the predictive decoding device illustrated in FIG. 7.

Referring to FIG. 8, a predictive decoder is usable as each of the first and the second predictive decoders 62 and 63. For brevity of description, it is assumed that the illustrated predictive decoder is used as the first predictive decoder 62 and therefore has the first and the second decoder input terminals 62a and 62b and the decoder output terminal 62c. The first encoded input signal is sent to a first adder 66 which is supplied from a first multiplier unit 67 with a local predictive signal which is calculated on the basis of Equation (1). A result of addition between the first encoded input signal and the local predictive signal is sent from the first adder 66 to the decoder output terminal 62c through a first register unit 68 as the first decoded signal. The first decoded signal is also sent to a second adder 72 as a decoded signal concerned with the first previous picture element a (FIG. 5). On the other hand, the second delayed decoded signal is sent from the second predictive decoder 63 to the second decoder input terminal 62b and is delivered to a second register unit 73 and a third adder 74 so as to specify decoded signals concerned with the second and the third previous picture elements b and c. The third adder 74 supplies a second multiplier 75 with a sum signal representative of a sum calculated in the third adder 74 and the second multiplier unit 75 multiplies the sum signal by a factor of $\frac{1}{2}$ to produce a product signal representative of a product of the sum signal and the factor of $\frac{1}{2}$. The product signal is added to the decoded signal concerned with the first previous picture element a by the second adder 72 to be sent as a local sum signal to the first multiplier unit 67. The first multiplier unit 67 multiplies the local sum signal by ($\frac{1}{2}$) to supply the local predictive signal to the first adder 66. Thus, the first encoded input signal is successively decoded into the first decoded signal.

Similar operation is carried out in the second predictive decoder 63 to produce the second decoded signal.

Figure 9:
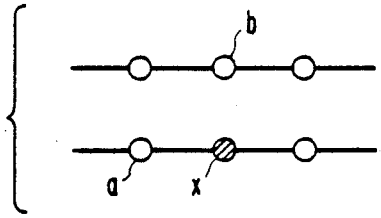
FIG. 9 shows a part of scanning lines for use in describing operation of a CODEC system according to another embodiment of this invention.

Referring to FIGS. 9 and 10, the intra-field prediction is assumed to be executed in accordance with Equation (2) given by:

$$x = (\tfrac{1}{2})(a+b), \tag{2}$$

where x represents a current picture element and a and b represent first and second previous picture elements similar to those illustrated with reference to FIG. 5. Moreover, it is assumed in FIG. 10 that the picture elements arranged on each of the odd number scanning line and the even number scanning line are equal in number to 1000. In this event, the first through the fourth delay circuits 36, 42, 43, and 44 illustrated in FIG. 3 have first through fourth delay times equal to three sample periods, two sample period, 996 sample periods, and three sample periods, respectively, like the first through the fourth delay units illustrated in FIG. 7. In this connection, the predictive encoding proceeds in the predictive encoding device in accordance with a time chart illustrated in FIG. 10. Inasmuch as FIG. 10 is similar to FIG. 6 except the delay times, the predictive encoding of FIG. 10 is readily understood in comparison with FIGS. 6 and 10. Accordingly, FIG. 10 will not be described any longer.

Referring to FIG. 11, a predictive encoder is operable as the first and the second predictive encoders on conditions illustrated in FIGS. 9 and 10. The illustrated predictive encoder is similar in structure and operation to that illustrated in FIG. 4 except that the second register 57, the second adder 54, and the first multiplier 58 are omitted from FIG. 11. This is because no consideration is made in FIG. 11 about the third previous picture element c, as is apparent from Equation (2). When the predictive encoder is used as the first predictive encoder 32 (FIG. 3), the first local decoded signal depicted at a is sent through the register 56 to be delivered to the second predictive encoder 37 and to the adder 55 which is supplied with the second local decoded signal specified by b. Since the other operation is similar to that illustrated in FIG. 4, description will be omitted from the instant specification.

Referring to FIG. 12, a predictive decoder is operable as the first and the second predictive decoders 62 and 63 illustrated in FIG. 7 and is similar to that illustrated in FIG. 8 except that the second register unit 73, the third adder 74, and the second multiplier unit 75 are omitted from FIG. 12. In this connection, the second local decoded signal specified by b is directly supplied from the second predictive decoder 63 to the second adder 72 to be added to the first decoded signal specified by a. Any other operation is similar to that illustrated in FIG. 8 and will not be described any longer.

While this invention has thus far been described in conjunction with a few preferred embodiments thereof, it will readily be possible for those skilled in the art to put this invention into practice in various other manners. For example, this invention is applicable to PAL system or SECAM system. In this case, it is to be noted that the picture elements of 864 are arranged in each scanning line. Therefore, the delay times of the first through the fourth delay circuits or units should be selected in consideration of the number of the picture elements arranged in each scanning line.

What is claimed is:

1. A predictive encoding device operable in response to an input image signal to encode said input image signal into an output encoded signal, said input image signal being divisible into an odd number line signal and an even number line signal, said predictive encoding device comprising:

line separating means responsive to said input image signal for separating said input image signal into said odd number line signal and said even number line signal;

first predictive encoding means coupled to said line separating means and responsive to a selected one of said odd and said even number line signals for carrying out predictive encoding of said selected one of the odd and the even number line signals to produce a first encoded signal and a first local decoded signal;

first delay means coupled to said line separating means for delaying a remaining one of said odd and said even number line signals to produce a delayed line signal;

second predictive encoding means responsive to said delayed line signal for carrying out predictive encoding of said delayed line signal to produce a second encoded signal and a second local decoded signal;

second delay means coupled to said first predictive encoding means and responsive to said first local decoded signal for delaying the first local decoded signal to supply said second predictive encoding means with a first delayed local decoded signal and to make said second predictive encoding means carry out said predictive encoding on the basis of said first delayed local decoded signal;

third delay means coupled to said second predictive encoding means for delaying said second local decoded signal to supply said first predictive encoding means with a second delayed local decoded signal and to make said first predictive encoding means carry out said predictive encoding on the basis of said second delayed local decoded signal;

fourth delay means coupled to said first predictive encoding means and responsive to said first encoded signal for delaying said first encoded signal in relation to said second encoded signal to produce a first delayed encoded signal; and multiplexing means for multiplexing said first delayed encoded signal and said second encoded signal to alternatingly produce the first delayed encoded signal and said second encoded signal as said output encoded signal.

2. A predictive encoding device as claimed in claim 1, each of said odd and said even number line signals including a predetermined number of sampled picture elements each of which lasts for a sample period, wherein said first through said fourth delay means have first through fourth delay times determined in relation to said predetermined number of the picture elements.

3. A predictive encoding device as claimed in claim 2, wherein said predetermined number is equal to 858 while said first, second, third, and fourth delay times are equal to three, one, 853, and three times of said sample periods, respectively.

4. A predictive encoding device as claimed in claim 2, wherein said predetermined number is equal to 1000 while said first, second, third, and fourth delay times are equal to two, one, 997, and two times of said sample periods, respectively.

5. A predictive encoding device as claimed in claim 1, wherein said first predictive encoding means comprises:

a first subtracter responsive to said selected one of the odd and the even number line signals and a first local predictive signal for subtracting said first local predictive signal from said selected one of the odd and the even number line signals to produce a first difference signal representative of a difference between said first local predictive signal and said selected one of the odd and the even number line signals;

a first quantizer coupled to said first subtracter for quantizing said first difference signal into a first quantized signal;

means for producing said first quantized signal as said first encoded signal;

a first adder supplied with said first quantized signal and said first local predictive signal to produce said first local decoded signal; and first calculating means supplied with said first local decoded signal and said second delayed local decoded signal for calculating a first prediction signal concerned with said selected one of the odd and the even number line signals in accordance with a predetermined formula; and means for supplying said first subtracter with said first prediction signal as said first local predictive signal;

said second predictive encoding means comprises:

a second subtracter responsive to said delayed line signal and a second local predictive signal for subtracting said second local predictive signal from said delayed line signal to produce a second difference signal representative of a difference between said second local predictive signal and said delayed line signal;

a second quantizer coupled to said second subtracter for quantitizing said second difference signal into a second quantized signal;

means for producing said second quantized signal as said second encoded signal;

a second adder supplied with said second quantized signal and said second local predictive signal to produce said second local decoded signal; and second calculating means supplied with said second local decoded signal and said first delayed local decoded signal for calculating a second prediction signal concerned with said delayed line signal in accordance with said predetermined formula; and means for supplying said second subtracter with said second prediction signal as said second local predictive signal.

6. A predictive decoding device operable in response to an input encoded image signal to decode said input encoded image signal into an output decoded signal, said input encoded image signal being subjected to predictive encoding and divisible into an odd number line signal and an even number line signal, said predictive decoding device comprising:

a line separating circuit responsive to said input encoded image signal for separating said input encoded image signal into said odd number line signal and said even number line signal;

a first predictive decoding circuit responsive to a selected one of said odd and said even number line signals for carrying out predictive decoding of said selected one of the odd and the even number line signals to produce a first decoded signal;

a first delay circuit for delaying a remaining one of said odd and said even number line signals to produce a delayed line signal;

a second predictive decoding circuit responsive to said delayed line signal for carrying out predictive decoding of the delayed line signal to produce a second decoded signal;

a second delay circuit for delaying said first decoded signal to produce a first delayed decoded signal and to supply said second predictive decoding circuit with the first delayed decoded signal;

a third delay circuit for delaying said second decoded signal to produce a second delayed decoded signal and to supply said first predictive decoding circuit with the second delayed decoded signal;

a fourth delay circuit coupled to said first predictive decoding circuit for delaying said first decoded signal to adjust said first decoded signal with said second decoded signal and to produce an adjusted decoded signal; and a line multiplexing circuit for alternatingly producing the adjusted decoded signal and said second decoded signal as said output decoded signal.

* * * * *

UNITED STATES PATENT AND TRADEMARK OFFICE
CERTIFICATE OF CORRECTION

PATENT NO. : 5,063,443

DATED : November 5, 1991

INVENTOR(S) : Masayuki Okajima, et al

It is certified that error appears in the above-identified patent and that said Letters Patent is hereby corrected as shown below:

Abstract, line 18, delete "83" and insert --63--.

Col. 1, line 41, delete "precessed" and insert --processed--.

Col. 5, line 46, delete "respectvely" and insert --respectively--.

Col. 8, line 21, after "4-856" insert --4-857,--.

UNITED STATES PATENT AND TRADEMARK OFFICE
CERTIFICATE OF CORRECTION

PATENT NO. : 5,063,443
DATED : November 5, 1991
INVENTOR(S) : Masayuki Okajima, et al It is certified that error appears in the above-identified patent and that said Letters Patent is hereby corrected as shown below:

Col. 10, line 21, after "periods." insert --The line multiplexer circuit 64 alternatingly--.

Col. 11, line 11, delete "period" and insert --periods--.

Col. 13, line 31, delete "quantitizing" and insert --quantizing--.

Signed and Sealed this

Thirtieth Day of March, 1993

Attest:

STEPHEN G. KUNIN

Attesting Officer        Acting Commissioner of Patents and Trademarks